United States Patent Office 3,331,189
Patented July 18, 1967

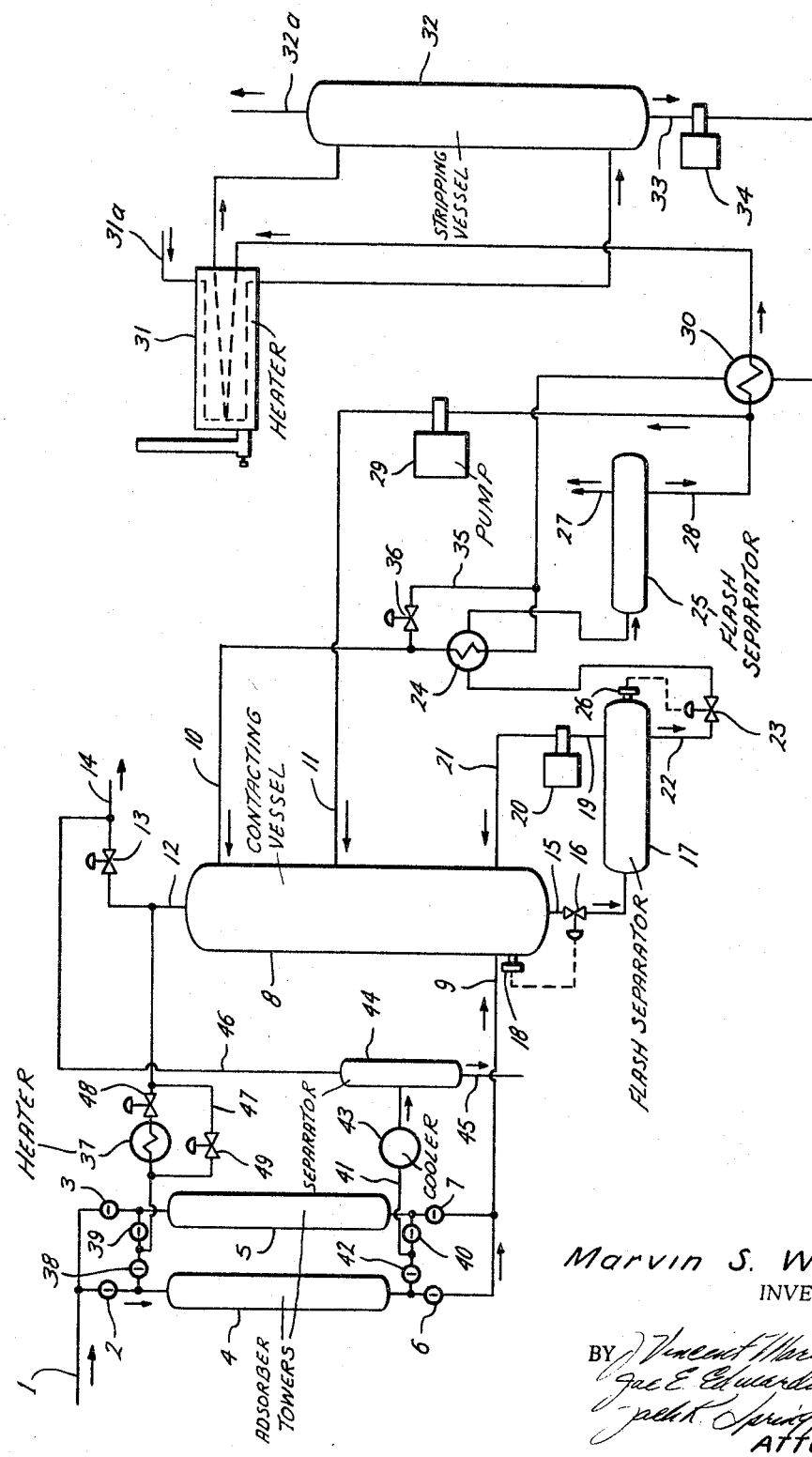

3,331,189
METHOD OF PROCESSING A GAS STREAM
Marvin S. Worley, Oklahoma City, Okla., assignor to Black, Sivalls & Bryson, Inc., Kansas City, Mo., a corporation of Delaware
Original application Feb. 19, 1964, Ser. No. 345,942. Divided and this application Oct. 3, 1966, Ser. No. 585,709
8 Claims. (Cl. 55—62)

This application is a division of application S.N. 345,-942, filed Feb. 19, 1964, and now abandoned.

The present invention relates generally to a process for removing acid gas from a hydrocarbon fluid stream and recovering desirable hydrocarbons. Specifically the present invention relates to a process for removing acid gas from a hydrocarbon fluid stream and recovering the desirable hydrocarbons removed from the stream incidental to the acid gas removal.

Prior to the present invention both absorption and chemical reaction processes have been used for the removal of acid gases such as hydrogen sulfide and carbon dioxide from a hydrocarbon fluid stream such as a natural gas well-stream. In a chemical reaction process such as one which includes the intimate contacting of the gas stream with monoethanolamine or diethanolamine, considerable additional expense, both in intitial equipment and operating costs, is required as compared to an absorption system. The chemical reaction type of process mentioned above does not remove the desirable hydrocarbons from the fluid stream being processed. In many of the absorption processes of the prior art a substantial amount of the hydrocarbons will be absorbed in the system and in all such processes, these absorbed hydrocarbons are lost in the regeneration of the liquid absorbent. In most cases the quantity of ethane and heavier hydrocarbons absorbed is so great that the absorption process becomes uneconomical for removing the acid gases. In other cases, the quantity of ethane and heavier hydrocarbons absorbed is much less but still of such a magnitude as to contaminate the discharged hydrogen sulfide so that it cannot be used for making elemental sulfur by the most economical methods, without further treatment. It is well known in the prior art that certain solid type adsorbents will be suitable for the processing of a hydrocarbon fluid stream for the removal of desirable hydrocarbon fractions but such adsorbents will not economically remove any substantial amount of the acid gases present in the hydrocarbon fluid stream being processed.

An object of the present invention is to provide a process for the removal of acid gas from a hydrocarbon fluid stream and for the recovery of desirable hydrocarbons from such stream.

A further object of the present invention is to provide a combination absorption and adsorption process for the removal of acid gas from and for the recovery of desirable hydrocarbons from a hydrocarbon fluid stream.

Another object of the present invention is to remove acid gases from a hydrocarbon fluid stream by absorption having a minimum amount of the soluble hydrocarbon components in the removed acid gases.

Another object of the present invention is to recover a substantially pure acid gas component from a natural gas stream containing a light hydrocarbon gas component, a heavier hydrocarbon gas component and an acid gas component.

Still another object of the present invention is to provide an absorption process for removal of acid gases from a hydrocarbon fluid stream in which hydrocarbon components which are soluble in the absorption liquid are adsorbed from the stream prior to the absorption of the acid gases from the stream.

A still further object of the present invention is to provide a process for the recovery of desirable heavier hydrocarbons from a hydrocarbon fluid stream by adsorption and the further processing of the stream by absorption to remove acid gas therefrom.

These and other objects of the present invention are more fully explained and discussed hereinafter with reference to the drawings wherein:

The drawing is a schematic flow diagram of one form of the process of the present invention.

Referring more in detail to the drawing:

A natural gas stream which is to be processed by the system of the present invention as illustrated in the drawing is conducted through line 1 to valves 2 and 3. This gas stream will contain some acid gas and some hydrocarbon gases, such as methane, ethane, propane, butane and the pentanes and heavier hydrocarbons. It is desired to remove the heavier hydrocarbons such as propane and heavier from the gas stream and to remove the acid gas from the gas stream leaving a gas stream composed substantially of methane and ethane. Valve 2 is connected into adsorber tower 4 and valve 3 is connected into adsorber tower 5. Towers 4 and 5 are filled with a solid adsorbent material which will adsorb the propanes and heavier hydrocarbons and in some cases any water vapor present in the gas stream but will not adsorb any substantial quantities of acid gases present in the stream. It should be noted that while only two towers 4 and 5 are shown any number of adsorber towers may be used to adapt to the economy of processing the size and content of the natural gas stream. Normally, to maintain continuous operations two or more towers will be used. Adsorbent materials commonly used for the adsorption of propane and heavier hydrocarbons from natural gas streams such as sova beads, activated alumina, silica gel or charcoal are the materials whose use is contemplated by the present invention. As shown in the drawing valve 2 is open and valve 3 is closed so that the gas stream is conducted through tower 4. Valves 6 and 7 connect into the outlet connections from towers 4 and 5 respectively. With valve 2 open, valve 6 will be open to conduct the gas stream from tower 4 to contacting vessel 8. The gas stream flowing into contacting vessel 8 through inlet 9 will be substantially free of the propanes and heavier hydrocarbons. While the gas stream is flowing through tower 4, tower 5 will be in the process of being regenerated, as hereinafter more fully explained, to remove the adsorbed components from the adsorbent material and to recover the heaviest of these components.

Within contacting vessel 8 the gas stream flows upwardly and is intimately contacted with a suitable liquid absorbent in a plurality of stages (not shown). Generally, any suitable type of contacting device such as bubble trays or packing may be used to provide an intimate counter-current contact between the gas stream and the liquid absorbent. The liquid absorbent is introduced into contacting vessel 8 through upper liquid absorbent inlet 10 and intermediate liquid absorbent inlet 11. The gas stream after being thoroughly contacted by the liquid absorbent within contacting vessel 8 to remove the acid gas therefrom is discharged from the upper part of vessel 8 through gas outlet 12 and is conducted through pressure reducing valve 13 to line 14. The liquid absorbent used to contact the gas stream in contacting vessel 8 is carefully selected to have a substantial capacity for absorbing the particular acid gas or gases contained in the gas stream. Many liquid absorbents such as the polybasic aliphatic alcohols, their ethers, esters and ether esters have a high capacity for absorption of acid gases generally present in natural gas streams but have not been used previously in such applications because they also have a substantial capacity for the absorption of the propane and heavier components of the natural gas stream. With these components removed prior to the absorption the most economical absorbent liquid may be used without contamination of the acid gases or loss of the desirable heavier hydrocarbon components of the natural gas stream. The gas leaving the system of the present invention will have a minimum amount of acid gas present and will be substantially free of the propanes and other heavier hydrocarbons.

In some applications of the present invention it may be desirable that the gas used for regeneration of the adsorbent in towers 4 and 5 be taken from the inlet 9 and in such applications the pressure reducing valve 13 will therefore be positioned in inlet 9 rather than gas outlet 14.

The liquid absorbent collecting in the lower portion of contacting vessel 8 is discharged therefrom through liquid outlet 15 and flows through valve 16 into flash separator 17. Valve 16 is responsive to liquid level controller 18 which maintains a proper level of liquid within the lower portion of contacting vessel 8 to prevent the discharge of gas with the discharge of the liquids from contacting vessel 8. The pressure on the liquids flowing through valve 16 is reduced so that the pressure within flash separator 17 is substantially less than the pressure within contacting vessel 8. For example, assuming that contacting vessel 8 is operating at a pressure of 1000 pounds per square inch then flash separator 17 will operate at approximately 500 pounds per square inch. The vapors flashed from the liquid by the pressure reduction will be separated and discharged from flash separator 17 through vapor outlet 19. These vapors, because of their reduced pressure are pumped by pump 20 through line 21 back into the lower portion of contacting vessel 8. These vapors will be substantially only methane and ethane with small quantities of the acid gas. Their return to contacting vessel 8 will minimize the loss of methane and ethane by absorption. The acid gas which is returned to contacting vessel 8 from flash separator 17 will be absorbed again by the liquid absorbent. If desired, however, the flash gases from flash separator 17 may be used to provide pneumatic power for the process components and fuel for combustion to supply heat to the process. An economic balance must be made to determine the value of these flash gases if returned to contacting vessel 8 considering the cost of recompression as compared to their value as a source of pneumatic power and fuel. The liquids are discharged from flash separator 17 through liquid outlet 22 and are conducted through valve 23 and heat exchanger 24, into flash separator 25. Valve 23 is controlled by liquid level controller 26.

The liquid discharged into flash separator 25 may have been heated and will have been subject to a pressure reduction through valve 23 whereby a substantial portion of the acid gas absorbed by the liquid absorbent will be vaporized. The acid gas vapors are separated from the liquid absorbent in flash separator 25 and are discharged through vapor outlet 27. The liquid absorbent is discharged from flash separator 25 through liquid outlet 28 and a portion of the liquid absorbent may be conducted to pump 29 for introduction into contacting vessel through intermediate liquid absorbent inlet 11. The remaining portion of the liquid absorbent discharged from flash separator 25 is conducted through heat exchanger 30 and heater 31 into the upper portion of stripping vessel 32. In large units the liquid from conduits 22 and 28 may be passed through turbines for power to pump regenerated liquid from conduit 33 into tower 8. A sweet gas stream is conducted through line 31a and heater 31 into the lower portion of stripping vessel 32. Within stripping vessel 32 a counter-current contact is achieved between the warm sweet gas and the heated partially regenerated absorbent liquid. The reconcentrated liquid absorbent is discharged from stripping vessel 32 through liquid outlet 33 and is pumped by pump 34 through heat exchanger 30 and heat exchanger 24 or by-pass 35 and valve 36 into contacting vessel 8 through upper liquid absorbent inlet 10. The gas stream is discharged from stripping vessel 32 through gas outlet 32a together with the acid gas which was stripped from the liquid absorbent within stripping vessel 32.

It should be noted that in certain installations one or more of the following listed elements of the previously described process may be eliminated without departing from the spirit of the present invention if conditions such as degree of regeneration of the absorbent liquid desired, the cost of the individual elements and their relative contribution to the results of the processing of the gas stream: flash separator 17, pump 20, heat exchangers 24 and 30, flash separator 25, pump 29, heater 31 and stripping vessel 32. Obviously, all of the aforementioned elements may not be eliminated unless some other suitable liquid absorbent regeneration means is substituted therefor. Factors such as the concentration of the acid gases, the absorption pressure, the degree of reconcentration of liquid absorbent needed, the desired maximum acid gas content in the outlet gas stream, the costs of equipment and operations and numerous other factors must be considered before eliminating items or substituting other equipment.

The regeneration of tower 5 as previously mentioned will be in process while the gas stream is flowing through tower 4. The regeneration gas flows from gas outlet 12 from contacting vessel 8 at a point ahead of pressure reducing valve 13 and is conducted through heater 37 to valves 38 and 39. While not shown heater 37 and heater 31 may be the same heater if economies can be effected in the heat requirements. Valve 38 is connected to the inlet of tower 4 and valve 39 is connected to the inlet of tower 5. With tower 4 processing the gas stream valve 38 will be closed and valve 39 will be open to allow the hot regeneration gas to flow through tower 5. In flowing through tower 5 the hot regeneration gas will vaporize the components of the gas stream which have been previously adsorbed therein when tower 5 was processing the gas stream. The regeneration gas stream will then flow from tower 5 through valve 40 into line 41. Valve 42 which controls the flow from tower 4 to line 41 will be closed. The regeneration gas stream flows through cooler 43 into separator 44. Sufficient cooling should be available in cooler 43 to condense substantially all of the desired heavier hydrocarbons which were absorbed in tower 5. These condensed hydrocarbons are separated from the regeneration gas stream in separator 44 and are discharged therefrom through liquid outlet 45 to a suitable storage area (not shown) or other processing. In some processes it is desirable that the heavier hydrocarbons be retained in the natural gas stream after the acid gases have been removed. In such cases the cooling of cooler 43 may be set so that only water and the heaviest of hydrocarbons will condense and be discharged through outlet 45 from separator 44. If desired separator 44 may in some cases be omitted and the regeneration gas stream conducted directly from cooler 43 to line 14 with cooler 43 providing sufficient cooling to prevent the temperature of gas flowing through line 14 from exceeding the temperature specified therefor. In this way all of the hydrocarbons originally separated will be returned to the natural gas stream after the acid gases have been removed and the removal of the acid gases is not complicated by the presence of the heavier hydrocarbons. The regeneration gas is discharged from separator 44 through outlet 46 and is conducted back into line 14 at a point downstream of pressure reducing valve 13. Generally, the operation of pressure reducing valve 13 is controlled by a flow controller (not shown) positioned in the regeneration gas stream so that sufficient pressure drop across valve 13 is maintained to provide adequate flow of regeneration gas for the regeneration of towers 4 and 5.

Also, the operation of the regeneration gas stream can be controlled so that if a particular heating or calorific value is required in the gas stream flowing out of the system through line 14 that sufficient portions of propane or other hydrocarbons can be retained in the regeneration gas stream leaving separator 44. This may be accomplished by controlling the temperature of the regeneration gas stream entering separator 44 whereby all of the propanes are not condensed. Adjustments of this temperature may be readily accomplished by control of cooler 43 or by providing a by-pass (not shown) around cooler 43 whereby the aggregate temperature of the regeneration gas entering separator 44 is not sufficiently cold to condense all of the propanes. The composition of heavier hydrocarbons leaving separator 44 can also be adjusted by the selection of the adsorbent material and the design details of the adsorption equipment.

The heating of the regeneration gas stream is accomplished in heater 37 but when the tower being regenerated is sufficiently free of the adsorbed components from the gas stream then it is desired to cool the adsorbent material within the tower. This is accomplished by causing the regeneration gas stream to flow through heater by-pass line 47. Valves 48 and 49 are provided to control the flow of the regeneration gas so that it will either flow through heater 37 or through line 47 in accordance with the condition of the tower being regenerated. With valve 48 open and valve 49 closed all of the flow of the regeneration gas will be through heater 37 and the tower which is on regeneration will be receiving heated regeneration gas. When valve 49 is open and valve 48 is closed then all of the regeneration gas will be flowing through by-pass line 47 and the tower on regeneration will be receiving cool regeneration gas to cool the reactivated adsorbent material within the tower.

Other types of regenerating systems are well known and may be used without departing from the spirit of the invention. For example, the regeneration gas can be a part of the natural gas stream. In an open type regeneration system the gas should be returned to a suitable place in the system. Care should be taken in using gas from these sources that the pressure in the regeneration system is maintained at the desired level.

The regeneration gas may be taken from any other appropriate source without departing from the scope of the present invention. In some cases the adsorbent material required may be charcoal and with this type system a steam type regeneration would be used.

In the form of the present invention shown in the drawing the gas stream is initially passed through an adsorption zone wherein the heavier hydrocarbon components are removed from the stream by adsorption and later recovered in the regeneration of the adsorption zone and then the stream is passed through an absorption zone wherein the acid gases are absorbed from the stream by the absorbent liquid and are thereafter separated from the absorbent liquid in the absorbent liquid regeneration. By proper selection of both the adsorbent material and the absorbent liquid the recovered hydrocarbons and the denuded gas stream will be substantially free of the acid gases and the acid gases recovered will be free of any appreciable amount of hydrocarbon contaminants. The hydrocarbons may be recovered in liquid state or returned to the denuded gas stream. Where the acid gas recovered is hydrogen sulphide it will be in a suitable state and sufficiently free of contaminants for ready conversion into free sulfur by well known methods.

The foregoing disclosure and description of the invention is illustrative and explanatory thereof, and various changes in the size, shape and materials, as well as in the details of the illustrated construction, may be made within the scope of the appended claims without departing from the spirit of the invention.

What I claim is:

1. The method of processing a natural gas stream containing a light hydrocarbon gas component, a heavier hydrocarbon gas component and an acid gas component to recover a substantially pure acid gas component including the steps of,
    first adsorbing substantially only the heavier hydrocarbon gas component from said natural gas stream in an absorption zone,
    thereafter absorbing the acid gas component from said light hydrocarbon gas component in an absorbent liquid having an affinity for adsorbing acid gas and heavier hydrocarbon gases to produce a gas stream containing substantially only said light hydrocarbon gas component,
    flowing a regeneration gas stream of said light hydrocarbon gas component through said adsorption zone to remove the adsorbed heavier hydrocarbon gas components from said adsorption zone, and
    combining said regeneration gas stream having the heavier hydrocarbon gas component therein with said light hydrocarbon gas stream after removal of said acid gas component.

2. The method according to claim 1, including the step of
    withdrawing said regeneration gas stream from said natural gas stream.

3. The method according to claim 1, including the step of
    withdrawing said regeneration gas stream from said lighter hydrocarbon gas stream.

4. The method according to claim 1, including the step of
    cooling the regeneration gas stream and said heavier hydrocarbon gas component prior to said combining step.

5. The method according to claim 4, including the step of
    removing the heavier hydrocarbon liquids condensed from said regeneration gas stream by said cooling step prior to said combining step.

6. The method according to calim 5, including the step of
    controlling the amount of cooling of said regeneration gas stream and said heavier hydrocarbon gas component to maintain in the gaseous phase all of those heavier hydrocarbons which are desired to be combined with said lighter hydrocarbon gas component.

7. The method according to claim 3, including
    heating said regeneration gas stream before said flowing step,
    cooling said regeneration gas stream after said flowing step and before said combining step,
    restricting the flow of said lighter hydrocarbon gas stream downstream of the point of withdrawal of said regeneration gas stream and upstream of the point of combining said regeneration gas stream with said light hydrocarbon gas component to create sufficient pressure drop for the desired flow of regeneration gas.

8. The method of adsorbing an acid gas component from a natural gas stream containing a light hydrocarbon gas component, a heavier hydrocarbon gas component and an acid gas component with an adsorbent liquid having an affinity for adsorbing both the acid gas component and the heavier hydrocarbon gas component to recover a substantially pure acid gas component comprising,
    first adsorbing substantially only the heavier hydrocarbon gas component from said natural gas stream in an adsorption zone,
    thereafter adsorbing with said adsorbent liquid having an affinity for adsorbing both said acid gas component and said heavier hydrocarbon gas component, substantially only the acid gas component from said light hydrocarbon gas component to produce a gas stream containing substantially only said light hydrocarbon gas component, flowing a regeneration gas stream of said light hydrocarbon gas component through said adsorption zone to remove the adsorbed heavier hydrocarbons from said adsorption zone, and combining said regeneration gas stream having the heavier hydrocarbon gas component therein with the light hydrocarbon gas stream after removal of said acid gas component.

References Cited

UNITED STATES PATENTS

| | | | |
|---|---|---|---|
| 2,982,721 | 5/1961 | Dow | 55—51 |
| 3,161,461 | 12/1964 | Deal et al. | 23—3 |

FOREIGN PATENTS 728,444    4/1955    Great Britain.

REUBEN FRIEDMAN, *Primary Examiner.*

C. M. HART, *Assistant Examiner.*